Feb. 28, 1939. J. W. BUTLER 2,149,083
SYSTEM OF ELECTRICAL DISTRIBUTION
Filed Oct. 30, 1937
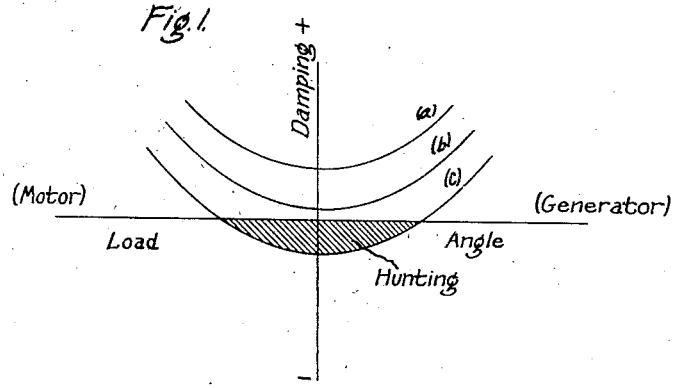
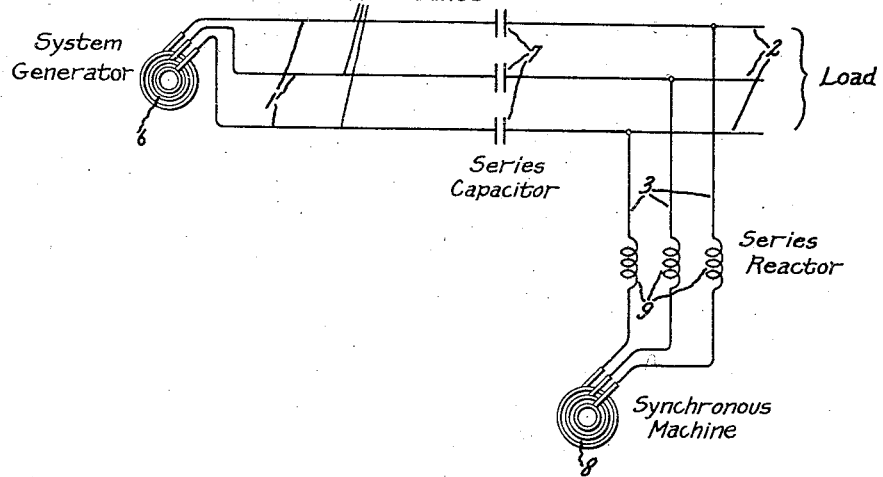
Inventor:
John W. Butler,
by Harry E. Dunham
His Attorney.

Patented Feb. 28, 1939

2,149,083

UNITED STATES PATENT OFFICE 2,149,083

SYSTEM OF ELECTRICAL DISTRIBUTION

John W. Butler, Schenectady, N. Y., assignor to General Electric Company, a corporation of New York Application October 30, 1937, Serial No. 171,941

2 Claims. (Cl. 172—237)

My invention relates to systems of electrical distribution and it has for its object the minimizing of hunting of a synchronous machine which is connected to a circuit containing a series capacitor.

A conventional alternating current power system consists of a group of interconnected synchronous machines, together with impedance and induction motor loads. Any such system is subjected practically every instant of its existence to disturbances caused by changes in load, switching, pulsating load, pulsating driving torques, changes in excitation, etc. These disturbances tend to set up rotor oscillations of the synchronous machines and for satisfactory operation the system constants must be such as to cause any such oscillations to disappear rapidly if caused by a momentary disturbance or to remain of small amplitude if due to a continuous pulsating force.

A series capacitor is a static electrical condenser which is connected in a power circuit for the purpose of improving the circuit's voltage regulation by reducing its over-all reactance. I have found however that the reduction in line reactance caused by the presence of a series capacitor substantially increases the tendency of synchronous machines to hunt and in some cases actually produces amplifying rotor oscillations or negative damping. Theoretical studies confirm this and show that for a single synchronous generator connected to an infinite bus, the ratio of line resistance to line reactance determines whether or not there is negative damping and that there is a critical operating angle, determined by this ratio, below which the machine is unstable.

In accordance with my invention, I eliminate the hunting of a synchronous machine, connected in one branch of a circuit containing three or more branches, which is caused by a series capacitor in another of the branches of the circuit. This I accomplish by connecting a reactor in series in the branch containing the synchronous machine which is hunting.

My invention will be better understood from the following description taken in connection with the accompanying drawing and its scope will be pointed out in the appended claims.

In the drawing, Fig. 1 is a set of load angle curves of a synchronous machine and Fig. 2 is a diagrammatic illustration of an embodiment of my invention.

In Fig. 1, the damping effect in a synchronous machine is plotted as ordinates against the load angle of the machine as abscissae. Above the origin, the damping effect is positive and tends to prevent rotor oscillation or hunting while below the origin the damping effect is negative and tends to produce amplifying rotor oscillations or hunting. Positive damping is produced by resistances in the rotor circuit, some types of load, mechanical friction and an amortisseur winding. Negative damping is produced by resistance in the lines or armature circuit, and absence of reactance in the lines. Load angle, that is to say, the angle of displacement between the poles of the rotor and the poles of the rotating magnetic field of the synchronous machine, is plotted to the right of the origin for a generator and to the left of the origin for a motor.

As will be seen from the three curves $(a)$, $(b)$ and $(c)$, damping always increases in the positive direction as the load angle increases. With curves $(a)$ and $(b)$ the damping is always positive but with curve $(c)$ there is a given load angle below which the damping is negative and hunting will occur. This is indicated by the cross hatched area. As explained above, one of the ways of producing negative damping, that is to say one of the ways of lowering the curves in a vertical direction as viewed in Fig. 1, is the addition of series capacitance in the lines connecting synchronous machines.

In Fig. 2 is shown my invention applied by way of example to a three-phase power system circuit having three branches 1, 2 and 3. However, my invention is entirely independent of the number of phases employed and it may be used with circuits having more than three branches if desired.

Branch 1 may be taken to represent a transmission line or feeder circuit containing appreciable amounts of inherent distributed inductance and resistance. This branch is connected at its left-hand-end to a power system or central station indicated diagrammatically by the synchronous generator 6. Series capacitor 7 is connected in the line 1 for improving its voltage regulation by neutralizing a substantial portion of the distributed inductance.

The branch circuit 2 is connected to any conventional load or loads (not shown) of either the impedance or induction motor type.

Branch 3 is connected to a synchronous machine 8 which may be either a synchronous motor, a synchronous condenser or a synchronous generator. Ordinarily the circuit arrangement as described thus far would cause severe hunting of the machines and in order to prevent this I connect in series with the machine 8 a reactor 9 which has a substantial reactance at the normal frequency of the circuit.

By means of this arrangement the reactance of the line interconnecting synchronous machines 6 and 8 is increased by the presence of the series reactor 9 while the voltage regulation of branches 1 and 2 between the main generator 6 and the load on branch 2 is not impaired by the series reactor 9 but in fact is improved by the series capacitor 7.

While I have shown and described a particular embodiment of my invention, it will be obvious to those skilled in the art that changes and modifications can be made therein without departing from the true spirit and scope of my invention.

What I claim as new and desire to secure by Letters Patent of the United States, is:

1. In a system of electrical transmission and distribution, an alternating current power circuit having at least three branches, one of said branches containing a series capacitor for improving its voltage regulation, another of said branches containing a synchronous machine which is subject to hunting by reason of said series capacitor, and means for suppressing the tendency of said machine to hunt comprising a reactor connected in the branch containing said machine.

2. In combination, an alternating current power system, a load, a power circuit interconnecting said system and said load, a synchronous machine connected to said circuit, a series capacitor connected in said circuit between said system and said machine for improving the voltage regulation of said circuit, said capacitor producing in said machine an objectionably large critical load angle within which negative damping of said machine occurs, and means for reducing said critical angle comprising a reactor connected in series with said machine but not in said power circuit between said system and said load.

JOHN W. BUTLER.